Sept. 17, 1935.  W. BAUERSFELD  2,014,874

PILLAR BRACKET FOR MONOBJECTIVE MICROSCOPES

Filed April 20, 1933

Inventor:
Walther Bauersfeld.

Patented Sept. 17, 1935

2,014,874

UNITED STATES PATENT OFFICE 2,014,874

PILLAR BRACKET FOR MONOBJECTIVE MICROSCOPES

Walther Bauersfeld, Jena, Germany, assignor to firm Carl Zeiss, Jena, Germany

Application April 20, 1933, Serial No. 667,030
In Germany April 25, 1932

2 Claims. (Cl. 88—39)

In connection with monobjective microscopes, it has been suggested to dispense with a special tube and to provide the upper end of the pillar bracket with a slide guide which lies in a plane at right angles to the optical axis of the microscope and is to guide an objective nose-piece. This position of the slide guide is not very advantageous in so far as replacing one objective nose-piece by another, or by an objective, is rather difficult when the pillar bracket is not raised and the space between microscope stage and guide, widened. According to the invention, a slide guide of the said kind, which is to receive the objective parts (that is to say an objective or an objective nose-piece), is provided in a plane inclined at an acute angle relatively to the optical axis of the microscope. This construction, which provides for an easy change of the parts in question and does away with the necessity of raising the pillar bracket, is especially useful when the slide is guided in a direction that lies in the plane of symmetry of the pillar bracket. The microscope will be particularly simple in construction when that end of the pillar bracket which bears the slide guide is given the form of an annular body attached to the pillar bracket proper by means of a corresponding cylindrical surface.

Figure 1:
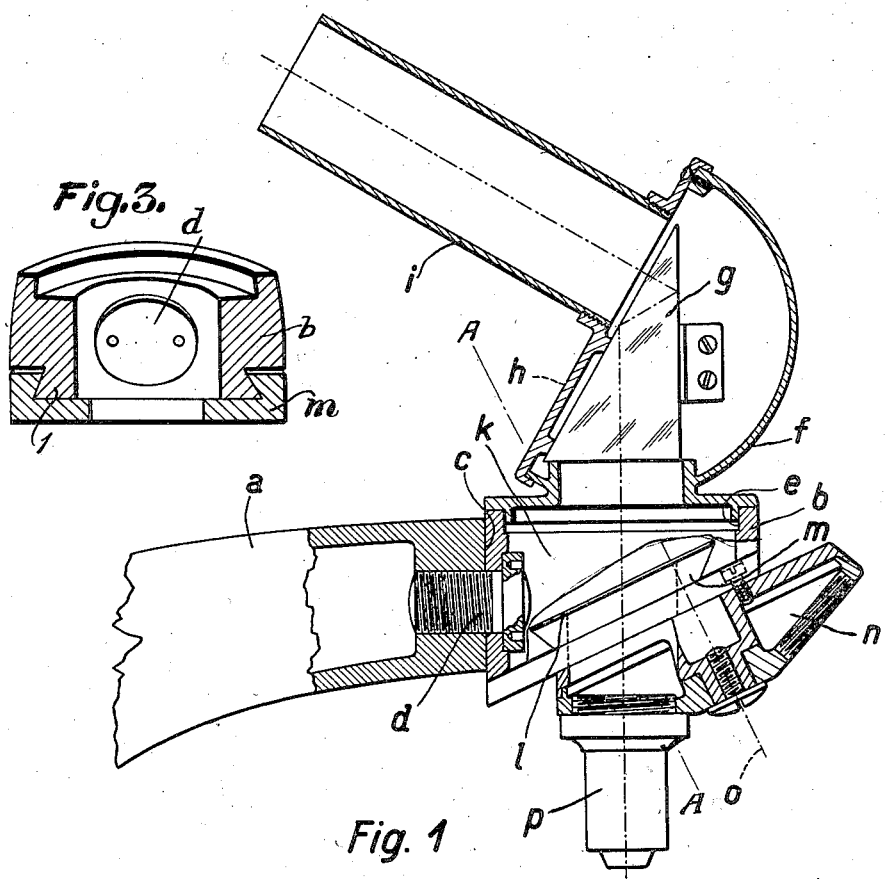
Figure 2:
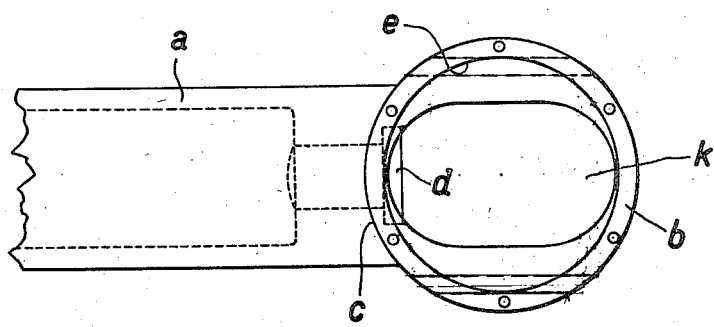

The accompanying drawing, which illustrates the invention, shows a constructional example in Figure 1 in elevation, partly in section, and in Figure 2 in plan. Figure 3 illustrates a section through a single part of the example according to line A—A in Figure 1.

The pillar bracket according to the constructional example consists of the pillar bracket proper, which is designated $a$, and an annular body $b$ having a cylindrical exterior surface. This annular body $b$ is connected by means of a screw $d$ to a corresponding cylindrical surface $c$ at the upper extremity of the pillar bracket $a$ and has at its upper end a cylindrical bore $e$ receiving a prism housing $f$. The prism housing $f$ contains a prism $g$ which causes the path of the observation rays to be deflected twice into the direction of an eyepiece socket $i$ screwed to a cover $h$ of the prism housing $f$. The remaining part of the annular body $b$ has an oblong bore $k$, the lower end of this body being splayed and provided with an inclined slide guide $l$. This slide guide $l$ receives a slide $m$ screwed to an objective nose-piece $n$. The slide guide $l$ is so inclined and the lower part of the annular body $b$ splayed in such a manner that the axis of rotation $o$ of the objective nose-piece $n$ is at right angles to the plane of the slide guide $l$. This construction reduces the optical path of the microscope to a minimum, and does not curtail the rigidity of the instrument.

Instead of the objective nose-piece $n$, an objective $p$ may be provided on the annular body $b$ direct. Interchanging these parts is effected very easily by substituting one slide in the guide $l$ for another.

I claim:

1. A pillar bracket for monobjective microscopes, having at its upper end a slide guide adapted to receive the objective parts and lying in a plane inclined at an acute angle relatively to the optical axis of the microscope, the guiding direction of the slide guide lying in the plane of symmetry of the pillar bracket.

2. A pillar bracket for monobjective microscopes, having at its upper end a cylindrical surface, an annular body fixed to the pillar bracket and fitting into the said cylindrical surface, the annular body being provided with a slide guide adapted to receive the objective parts and lying in a plane inclined at an acute angle relatively to the optical axis of the microscope.

WALTHER BAUERSFELD.